United States Patent Office 3,260,700

Patented July 12, 1966

3,260,700
BENZOTHIAZOLE POLYAMIDES

Bernard Rudner and Phillip E. Brumfield, Pittsburgh, and Paul M. Hergenrother, Wampum, Pa., assignors to Koppers Company, Inc., a corporation of Delaware No Drawing. Filed Sept. 19, 1962, Ser. No. 224,824
8 Claims. (Cl. 260—47)

This invention relates to polymeric linear condensation-type polyamides derived from compounds containing benzothiazole nuclei. In one specific aspect, it relates to novel benzothiazole homopolyamides characterized by greater heat stability than any polyamide heretofore known. In a further aspect, it relates to heat-stable co-polyamides containing benzothiazole nuclei which are good fiber formers and which have exceptional dye receptivity.

The common commercial polyamides are those derived from caprolactam (the so-called nylon 6), $\omega$-aminoundecanoic acid ("Rilsan") and the combination of adipic acid with hexamethylenediamine (nylon 66). Although these materials have achieved vast commercial success in the preparation of fibers and molded objects, their thermal, oxidative and hydrolytic stability afford inherent limitations on possible uses.

We have discovered a new class of polyamides containing benzothiazole nuclei which, unexpectedly, have greater thermal, oxidative and hydrolytic stability than any polyamide heretofore known. Our new polymers are also characterized by increased melting point and softening ranges.

None of the polyamides heretofore known contain a benzothiazole nucleus, although polymers containing such a nucleus are described in Morton et al., U.S. Patent 3,047,543. The polymers of Morton are useful adhesive components and must be made from a critical mixture of monomeric isomers in order to obtain a proper reaction and a polymer of the desired properties. We have not experienced this limitation in connection with the preparation of our polyamides. Our polymers also differ from those of Morton in that they are crystalline fiber formers by virtue of hydrogen bonding of the $$\overset{O}{\overset{\|}{-C}}-\overset{H}{\overset{|}{N}}-$$

group, which also gives them greater dye receptivity plus ability to be cross-linked, e.g. by condensation with aldehydes.

The polyamides of the invention are useful in various commercial and military applications wherein thermal stability and shock resistance are particular requirements. The homopolyamides, because of their ability to withstand temperatures up to about 580° C., are suitable materials for rocket nose cones. The use of the copolyamides varies with the structure of the comonomer polymerized with the monomer containing the benzothiazole unit. The copolyamides derived from the aliphatic-type comonomer are excellent fiber formers and provide nylon-type fibers of improved stiffness and heat stability. Aromatic-type comonomers provide a copolyamide of heat resistance approaching the homopolymer; thus these materials are suitable for the preparation of molded objects markedly resistant to shock and high temperatures.

It is, therefore, an object of the present invention to provide novel polyamides, containing benzothiazole nuclei, which are characterized by substantially improved thermal, oxidative and hydrolytic stability.

In accordance with the invention, we have discovered a novel homopolyamide of the formula:

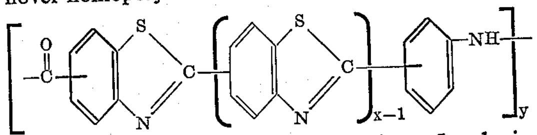

wherein $x$ is an integer having a value of 1 to 5 and $y$ is an integer having a value of at least 2, which is made by heating at a temperature of 180–450° C., preferably 220–420° C., in the presence of a catalyst if desired, a compound of the formula:

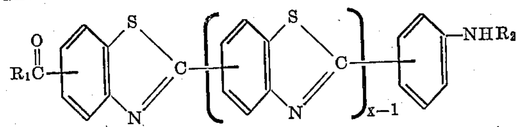

wherein $x$ has the value given aforesaid, $R_1$ is hydroxy, halogen, lower alkoxy or phenoxy and $R_2$ is hydrogen or acyl, preferably lower alkanoyl.

We have also discovered new copolyamides of the formula:

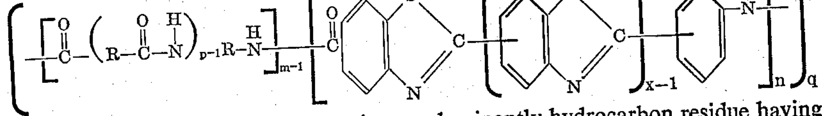

wherein R is a predominantly hydrocarbon residue having from 2–16 carbon atoms, more specifically a member selected from the group consisting of arylene radicals having from 6 to 16 carbon atoms and alkylene radicals having from 2 to 12 carbon atoms, $p$ is an integer having a value of 1 to 2, $x$ is an integer having a value of 1 to 5, $m$ has a minimum value of 1 and a maximum value such that the ratio of $m-1/n$ is no greater than 20, $n$ has a value of 1, and $q$ is an integer having a value of at least 2. The copolyamides of the invention are made by heating at a temperature of 180–450° C., in the presence of a catalyst if desired, a benzothiazole compound of the formula:

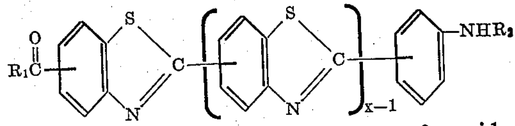

wherein $x$, $R_1$ and $R_2$ have the values given aforesaid with either (a) an amino carboxylic acid of the formula:

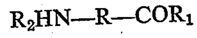

$$R_2HN—R—COR_1$$

wherein R, $R_1$ and $R_2$ have the values given aforesaid or (b) an equimolar mixture of a diamine of the formula:

$$R_2HN—R—NHR_2$$

and a diacid of the formula:

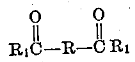

$$R_1\overset{O}{\overset{\|}{C}}—R—\overset{O}{\overset{\|}{C}}R_1$$

wherein R, $R_1$ and $R_2$ have the values given aforesaid, the quantity of the benzothiazole compound being at least 5 mole percent of the reaction mixture (i.e. m-21, n-1 in the copolyamide formula). In the case of the diamine and the diacid, R may represent a different member of the same group in each of the compounds, e.g. R of the diamine may be biphenylene and R of the diacid oxy-bisphenylene. The value of $p$ in the formula of the copolymer is one if an amino-acid is used as a reactant, and two if the comonomer is a mixture of a diamine and diacid or its equivalent.

The new polymers of the invention are readily derived, e.g. from commercially available dehydrothio-p-toluidine ($x$=1, below) and the equally available mixture of higher condensates ($x$=2, chiefly, with some $x$=3, 4 and 5 also present) generally sold as primuline base:

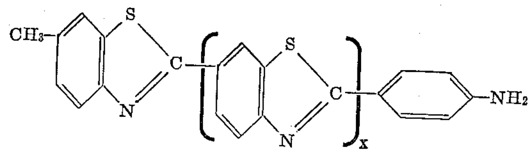

It has been possible to push the single preparation reaction to give products of higher value of $x$. It has also been possible, for example, by starting with m-toluidine, to obtain related materials.

To make the monomers useful in the invention the methyl group of the dehydrothiotoluidine or its higher condensation product is oxidized to the corresponding carboxylic acid. This is conveniently accomplished by protecting the amino group by acetylation and subsequently oxidizing the resulting acetyl derivative. The acetamidobenzothiazole carboxylic acid can be used as such in the preparation of the novel homopolyamide, since the acetyl group is removed by heating and converted to the free amine during polymerization. Other means of protecting the amino group can be used, e.g. conversion to a benzene sulfonyl derivative or an azo dye.

Polymerization is accomplished by heating the monomeric material to a temperature between about 180 and 450° C. The temperatures of polymerization (or copolymerization) necessary depend on the reactivity of the species used and the desired properties of the polymer. For example, homopolymerization of the amino-acid under "melt" conditions occurs so slowly below 200° C. as to be impractical. Slow polymerization at 200–280° C. (i.e. slowly raising the temperature over several hours while distilling off water) gives a more soluble and more readily moldable polymer; rapid heating to and at 380–450° C. under the same conditions gives, in shorter time, a stiffer polymer of higher molecular weight. Use of amino-acid derivatives of the proper choice permits more facile polymerization; in this respect an ester-amide, e.g.

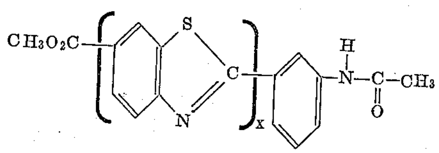

goes better than the amido-acid, which is, in turn, better than the parent amino-acid. In general, copolymers, particularly with aliphatic components, proceed better at lower temperatures, since higher temperatures tend to cause degradation.

Polymerization is generally conducted in an inert atmosphere, e.g. under a blanket of nitrogen, argon, or hydrogen, at the required temperatures. Polymerization is generally effected at atmospheric pressure, although superatmospheric or subatmospheric pressures can be used, even in the same polymerization, if desired. For example, it is frequently advantageous to prepare a low molecular weight polyamide, say one of 1,000 to 5,000 ($q$ in the polymer formula is 2–4), under mild conditions; for example, by heating t-butyl 2-(4'-acetamidophenyl)benzothiazolecarboxylate in a vacuum at 180–250° C. until approximately from one-half to three-quarters the theoretical weight loss has been realized, then completing the polymerization as a compression molding at, say, 12,000 p.s.i.g. and 350° C. The final product, under these conditions, is a "cured," insoluble and infusible rigid body, resistant to ablation as well as thermal degration, having a molecular weight estimated to be at least 300,000 ($q$ is 30–50). We have found our products to be most useful when their molecular weights range from approximately 10,000 on up. Lower molecular weight products, such as the carefully synthesized

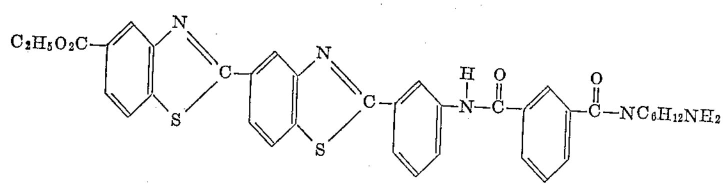

although not really a polymer, are useful as prepolymers in creating strong bonds between surfaces.

Although often most convenient, the dry-melt polymerization procedure described above is not always the best procedure to use. It is occasionally advantageous to conduct such polymerization in a liquid medium. One general means of accomplishing this involves stirring a solution or suspension in a high-boiling, or involatile liquid (for example, trichloronaphthalene or mineral oil) while distilling off the volatile condensation product. Less generally useful is the interfacial condensation technique. For example, the 1:1 addition product of glutaric anhydride and 2-(3'-aminophenyl)benzothiazole-5-carboxylic acid, converted to its diacid chloride, reacts in organic solution with an aqueous alkaline solution of bis-(2-aminoethoxy)ethane to give the polymer

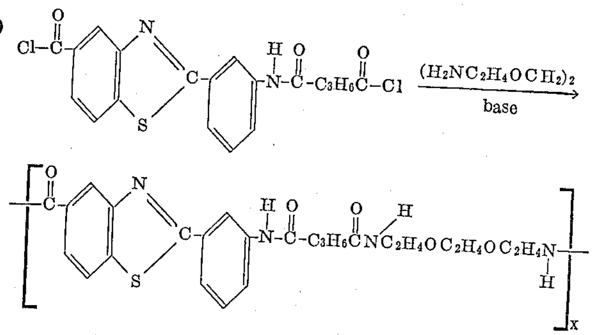

at the interface. The liquid media used need not be unreactive, but they must not exert a degradative effect on the polymer as it forms. For example, use of a solvent that reacts readily with water (acetic anhydride or polyphosphoric acid) will hasten polymerization, and is therefore desirable up to that point at which it interferes with the formation of the desired product.

If desired, conventional polyamide polymerization catalysts, such as the m-xylenediamine salt of isophthalic acid, metal alkoxides, acids or bases, can be used to shorten the polymerization time. If used, the catalyst is present in an amount of 0.5–2 percent by weight of the combined reactants.

The copolyamides of the invention are made by copolymerizing the amino-acid-benzothiazole monomer with an amino-acid of the formula:

$$H_2N—R—COOH$$

or its useful derivatives. As noted hereabove, R in the above formula represents a primarily hydrocarbon residue having from 2–16 carbon atoms, more specifically an arylene radical having from 6–16 carbon atoms or an alkylene radical having from 2–12 carbon atoms.

Particularly useful aromatic amino-acids are those in which the arylene radical is phenylene, bis-phenylene, oxy-bis-phenylene, thio-bis-phenylene, sulfonyl-bis-phenylene, and bis-naphthylene, including the halo, lower alkoxy or lower alkyl-substituted derivatives of the foregoing. Specific useful aromatic acids thus include p-aminobenzoic acid, anthranilic acid, (3-aminophenylsulfonyl)benzoic acid, 3-aminocarbazole-6-carboxylic acid, 3′-aminobipyridyl-(6,6′)-3-carboxylic acid, 2-(2′) - naphthoxy - 5-amino-8-naphthoic acid, 2-(3-aminophenyl)-2-(4-carboxyphenyl)propane, and the like.

If R is aliphatic, the useful comonomers thus include the simple amino-acids having from 2–12 carbon atoms including 11-aminoundecanoic acid, 5-amino-5-methylheptanoic acid, 2-aminopropionic acid, pyrrolidone, caprolactam, phenylacetylaminovalerate, and the like.

Alternatively, the copolyamides can be made by polymerizing the benzothiazole amino-acid in the presence of equimolar quantities of a diamine of the formula:

$$H_2N—R—NH_2$$

(or its useful derivatives) and a diacid of the formula:

$$HOOC—R—COOH$$

(or its useful derivatives) wherein R has the value given aforesaid. As noted hereabove, if the diamine and diacid are used, the R of each may be a different substituent. Useful diamines which can be mixed with the diacids include 4,4′-oxydianiline, benzidine, 3,3′-dialkoxybenzidine, 3,3′-dimethylbenzidine, 3,4′-sulfonyldianiline, fluorene-3,7-diamine, p-xylylenediamine, cyclohexylidene-bis-(p-aniline), 3,5-bis-(aminomethyl)pyridine, 2-phenylbenzothiazolylenediamine-5,4′, ethylenediamine, propylenediamine, 1,4-diaminobutene-2, menthanediamine, 1,3-dimethylcyclobutyl - 1,3 - diamine, oxy-bis-(3-aminopropane), and the like. Useful diacids include oxy-bis-(4-benzoic) acid, phenylbenzothiazole-4′,5-dicarboxylic acid, sulfonyl-bis-nicotinic acid, suberic acid, hexahydroterephthalic acid, phenylthionaphthyldicarboxylic acids, and the like.

The preparation of the copolyamides of the invention can be conducted as described hereabove or by any of the well-known methods involving the condensation of bifunctional dicarboxylic acids and bifunctional diamines. Alternative methods are those described in Carothers Patents 2,130,523 and 2,130,948.

The temperature used for the copolymerization should be somewhat lower than that used for the homopolymerization, since the copolyamides are somewhat less stable to heat. Suitable temperatures range from about 250–400° C. As in the case of homopolyamides, polymerization is generally effected in an inert atmosphere at atmospheric pressure, although it is somewhat advantageous to conduct the reaction under superatmospheric pressure to prevent the escape of volatile reactants, if such are used.

The choice of mole ratio of comonomers varies with the properties desired in the final product. If an aromatic comonomer is used with the monomer containing the benzothiazole unit, an excess of benzothiazole monomer is desirable, because the chief use of the product is in the production of molded objects of high stability to heat. The beneficial effects of aminobenzothiazole acid in raising melting points and increasing resistance to degradation are not apparent when less than about 5 mole percent of that component is present in the copolymer. Similarly, a truly flexible, readily moldable and workable copolymer cannot be obtained unless aliphatic components comprise at least 30 mole percent of the polymer. As noted hereabove, the principal use for the copolyamides derived from an aliphatic comonomer is in the preparation of fibers. In this case an excess of the benzothiazole monomer would make the resulting product too stiff or brittle.

Our invention is further illustrated by the following examples:

*Example I*

Acetic anhydride (45.0 g., 0.44 mole) was added during 20 minutes to a refluxing solution of dehydrothio-p-toluidine (99.0 g., 0.41 mole) in acetic acid (500 ml.). The mixture was stirred at reflux for an additional 1.5 hours and then cooled and poured in an equal volume of ice water. The tan solid was separated from the red liquid by filtration. The washed and dried solid (115.3 g). represented a quantitative yield of 2-(4′-acetamidophenyl)-6-methylbenzothiazole, melting at 233–34.5° C.

*Example II*

A solution of 2-(4′-acetamidophenyl)-6-methylbenzothiazole (60.5 g., 0.22 mole) in pyridine (650 ml.) was added dropwise during one hour to a vigorously stirred solution of potassium permanganate (60.0 g., 0.38 mole) in water (200 ml.) and pyridine (100 ml.) at 60° C. After the complete addition, the mixture was heated to and stirred at 95° C. for one hour with the disappearance of the purple color. Additional potassium permanganate (60.0 g., 0.38 mole) was added and the reaction mixture was stirred at 95° C. for one hour with the disappearance of the purple color. Again potassium permanganate (40.0 g., 0.25 mole) was added and the mixture stirred and refluxed for three hours. The cooled brown mixture was filtered. Treating the brown filter cake with sodium bisulfite and concentrating the yellow pyridine filtrate gave yellow solids. The combined yellow solids were dissolved in 2500 ml. of 2% potassium hydroxide solution and filtered. Acidification of the yellow filtrate with hydrochloric acid gave 60.0 g. (90% yield) of yellow solid, 2-(4′-acetamidophenyl)benzothiazole-6-carboxylic acid. No softening or melting could be detected below 330° C. on a standard melting point block. By dropping the powder onto a heated block at intervals of about 5° C., a rapid transition was noted at 320° C., the powder showing momentary softening then resolidifying. A purified sample gave the following elemental analysis:

Calc'd for $C_{16}H_{12}N_2O_3S$: Percent C, 61.62; percent H, 3.87; percent N, 8.97; percent S, 10.26; percent total, 84.72. Found: Percent C, 61.35; percent H, 3.95; percent N, 8.92; percent S, 10.29; percent total, 84.51.

*Example III*

A portion of 2-(4′-acetamidophenyl)benzothiazole-6-carboxylic acid (20.0 g.) was refluxed in a mixture of acetic acid (200 ml.), 37% hydrochloric acid (300 ml.) and water (200 ml.) for five hours. The bright yellow suspension was cooled and filtered. The yellow solid was slurried with warm water, filtered and dried to yield 14.7 g. of yellow solid, infusible to over 360° C. The infrared spectrum was consistent with the structure proposed for 2-(4′-aminophenyl)benzothiazole-6-carboxylic acid. The following elemental analysis was obtained:

Calc'd for $C_{14}H_{10}N_2O_2S$: Percent C, 62.22; percent H, 3.73; percent N, 10.37; percent S, 11.86, percent total, 88.18. Found: Percent C, 62.01; percent H, 3.92; percent N, 10.46; percent S, 11.91, percent total, 88.33.

*Example IV*

A sample (0.34 g.) of 2-(4′-aminophenyl)-6-benzothiazolecarboxylic acid was placed in a tube, fitted with a nitrogen inlet and outlet, and heated in a silicone oil bath. The yellow acid underwent a slight darkening and sintering near 290° C. The darkening increased when the acid was heated to 360° C. during the next 0.5 hour. The cooled brown material was washed with hot dimethylformamide. Infrared analysis of the dimethylformamide-insoluble material established the presence of a secondary amide. No absorptions characteristic of an aryl carboxylic acid could be detected.

A sample of the preceding polymer (0.5 g.) was heated in a tube under a nitrogen atmosphere to 505° C., and held at this temperature for one hour. Darkening and moderate shrinking occurred at about 460° C. At about 500° C., a trace of sublimate began to accumulate on the cooled part of the tube. The Dry Ice trap connected to the system collected a trace of liquid (0.0036 g.). Infrared analysis of the dark brown polymer gave the same absorption pattern as the original polymer. The trace of sublimate gave infrared absorption peaks suggestin amino and arylthiazole groups.

*Example V*

2-(4′-aminophenyl)benzothiazole-6-carboxylic acid (0.013 mole) and a catalyst, the m-xylenediamine salt of isophthalic acid (0.1 g.), were mixed in a nitrogen atmosphere and heated in a silicone oil bath to 380° C. for nine hours. Condensate and a yellow sublimate began to appear at 260° C. and 320° C., respectively. After five hours at 260–345° C., the condensate ceased to appear. Heating at 380° C. was continued for three hours. The cooled tan solid was extracted with first boiling pyridine, then ethanol, leaving 3.0 g. (98% of theory) of insoluble tan solid. The infrared absorption spectrum was consistent with the proposed structure of poly-[2-(p-phenylene)-6-carboxamidobenzothiazole], exhibiting absorptions at 3.0μ (—N—H), 6.08μ

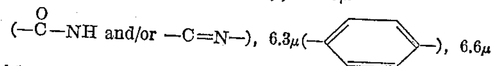

(amide II band), 12.1μ (p-substitution) and other absorptions characteristic of the desired polyamide. The elemental analysis of a sample gave the following results: Calc'd for $(C_{14}H_8N_2OS)_n$: C, 66.66%; H, 3.19%; N, 11.11%; S, 12.71%. Found: 66.63%; H, 3.28%; N, 10.90%; S, 12.48%. This remarkable agreement between calculated and determined values shows that a high molecular weight polymer was formed.

The product thus obtained was evaluated by thermogravimetric analysis. Calculations of relative thermal stability, carried out by the method of C. D. Doyle (WADD TR 60–283, May 1960), gave an "integral procedural decomposition temperature" of 555° C. Reported values for other polymeric materials include 420° C. for nylon 66 and 405° C. for a nylon-phenolic resin.

*Example VI*

In an attempt to obtain a polyamide having greater solubility, the condensation polymerization of 2-(4′-aminophenyl)benzothiazole-6-carboxylic acid was repeated at a lower temperature and over a longer period of time.

2-(4′-aminophenyl)benzothiazole-6-carboxylic acid (3.5 g., 0.013 mole) and a catalyst, the m-xylenediamine salt of isophthalic acid (0.08 g.), were thoroughly mixed and heated in an argon atmosphere via a silicone oil bath between 250–315° C. for 25 hours. During the first 14 hours at 250–290° C., the weight loss was 0.17 g. The infrared spectrum of a sample indicated that essentially no condensation had occurred and the water collected was probably water of hydration. During the following five hours at 300–315° C., the weight loss was 0.26 g. The infrared spectrum indicated an appreciable amount of secondary amide and also the presence of some starting material. Additional heating at 300–315° C. during six hours resulted in a weight loss of 0.04 g. The resulting polyamide was washed with boiling pyridine followed by ethanol to give 3.0 g. (98% yield) of a tan solid. The infrared spectrum was consistent with the proposed structure of poly-[2-(p-phenylene)-6-carboxamidobenzothiazole], exhibiting —NH— absorptions at 3.0μ, —CONH and/or —C=N— at 6.08μ, phenyl at 6.3 and 6.65μ, amide II band at 6.75μ, para-substitution (two free hydrogen) at 12.05μ, and other absorptions characteristic of the desired polyamide.

In studying the solubility of the novel polyamide, a solution of each of the products of Examples V and VI was made in concentrated sulfuric acid. At a concentration of 0.5%, only a trace of floc remained undissolved in the acid at room temperature. Inherent viscosities found at 25° C. were 0.81 and 0.85. Efforts to dissolve the polyamide in hot dimethylsulfoxide gave a slight color to the solvent, but no detectable weight loss for the solid was noted. With formic acid (97%) (30 ml.), the polyamide (0.3 g.) gave no evidence of solution after one hour at 25° C. After raising the temperature to reflux and filtering hot, the residual solid weighed 0.28 g. The formic acid filtrate deposited a yellow fluffy solid after dilution with water.

*Example VII*

2-(4′-acetamidophenyl)-6-benzothiazolecarboxylic acid (0.3750 g., 0.0012 mole) was heated under nitrogen atmosphere in a tube immersed in a molten salt bath. At 200° C., vapors evolved that were condensed in a Dry Ice cooled trap attached to the exit of the tube. The yellow acid gradually darkened as the temperature was increased from 300 to 435° C. for 45 minutes. The temperature was then increased to 535° C. during the next ten minutes. The material turned dark brown and appeared to decompose slightly at 520° C. After cooling, the dark brown, granular solid was washed with dimethylformamide. The dimethylformamide wash contained no starting material. Infrared analysis of the dark brown solid showed absorptions characteristic of a secondary amide, but no absorption characteristic of an aryl carboxylic acid could be detected. The liquid collected in the Dry Ice trap had the odor of acetic acid and was titrated with base. It was found that 0.7 mole of acetic acid was formed per mole of starting material. This would indicate that the average value for $n$ in

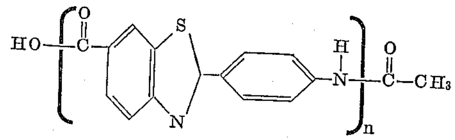

is about 3.3, provided all of the evolved acid had been condensed by the trap.

*Example VIII*

Sufficient 2-(4′-acetaminophenyl)benzothiazole to fill a cylindrical mold cavity, about ⅞″ diameter and ¼″ deep, was compressed at 2600–2800 p.s.i. and heated to 300° C. for 30 minutes. Upon cooling the mold, a quantity of polymeric material had been squeezed from the mold to form hard, dark brown beads. The piston portion of the mold was found to have become bound by the polymer to the outer mold so firmly as to cause scoring when forced apart.

*Example IX*

A mixture, 0.96 g. total, of equal weights of caprolactam and 2-(4′-aminophenyl)-6-carboxybenzothiazole, was placed in a flask and while in a nitrogen atmosphere, subjected to a temperature increased via salt bath. The temperature was increased during one hour to 280°. The yellow mixture turned a tan color and a liquid was collected in the Dry Ice trap. The tan mixture was then heated to 290° C. for one hour. During this period, more darkening occurred and the mixture became very viscous. The cooled brown solid was ground fine and washed with hot water to yield a yellow solid. The yellow solid was washed with dimethylformamide. The tan material, insoluble in dimethylformamide, weighed 0.4 g. Infrared analysis of a sample indicated it to be the desired polyamide and confirmed the presence of an aliphatic chain and aryl benzothiazole units.

*Example X*

Small mixtures (2.0 g. total) were prepared and heated at 250° C. for five hours under a nitrogen atmosphere, as follows:

Sample 1. Caprolactam with 5% catalyst
Sample 2. Caprolactam (80%) and 2-(4'-aminophenyl) benzothiazole-6-carboxylic acid (20%) with 5% catalyst
Sample 3. Caprolactam (90%) and 2-(4'-aminophenyl) benzothiazole-6-carboxylic acid (10%) with 5% catalyst.

All three polymerization samples were fluid at about 200° C. Sample 1 was white, Sample 3 was light yellow and Sample 2 was deep yellow. At room temperature, the flexibility of small strips of the polymers was as follows: Sample 1—flexible, Sample 3—moderately brittle and Sample 2—very brittle. All three samples turned black at about 300° C. Infrared absorption spectra of the three polymers showed the presence of polyamide and the absence of measurable carboxylic acid absorption.

*Example XI*

A mixture of equimolar amounts (0.015 mole) of oxy-bis(4-benzoic) acid (3.87 g.), 4,4'-oxydianiline (3.00 g.) and 2-(4'-aminophenyl)benzothiazole-6-carboxylic acid (4.05 g.) was placed in a reactor equipped for nitrogen atmosphere and heated to 350° C. during 10 hours. At 147° C., condensates began to appear and at 192° C. a white sublimate appeared which was thought to be oxydibenzoic acid. A color change to green began to occur at 223° C. and to blue at 280° C. At this point, a small amount of toluene was added to wash down the sublimate. To prevent further sublimation, diphenyl ether was added and the suspension refluxed (247° C.) for two hours. The solvent was removed and the blue solid heated to 350° C. during three hours. The polymeric blue solid was boiled in several portions of ethanol and dried to yield 7.75 g. (77% of theory). The infrared spectrum exhibited absorptions at 3.04μ, bonded N—H; 6.07μ, —CONH—; 6.55μ amide II band; 8.09μ, aryl ether; 12.0μ, para-substitution. Other weak absorptions characteristic of the benzothiazole unit were also present. The infrared spectrum was consistent with the proposed structure of the expected polyamide. A 1.0 g. sample was stirred in 50 ml. of concentrated sulfuric forming a clear dark green solution. Dilution with water gave a green solid which was washed wih dilute sodium hydroxide solution followed by water to give 0.95 g. of blue solid having an infrared spectrum identical to the starting blue polyamide. A sample submitted for elemental analysis gave the following results:

Calc'd for $(C_{40}H_{26}N_4O_5S)_n$: Percent C, 71.20; percent H, 3.88; percent N, 8.31; percent S, 4.75; percent total, 88.14.
Found: Percent C, 60.67; percent H, 3.73; percent N, 7.11; percent S, 7.03; percent total, 78.54.

The differences can be attributed to the sublimation loss of the oxy-bis-(4-benzoic) acid during the initial condensation.

*Example XII*

Crude commercial primuline base was freed of toluidine and sulfur, leaving as residue a mixture of predominantly 2'-(p-aminophenyl)-6-methyl-2,6'-bibenzothiazole ($x$=1), plus some of the higher homologs ($x$=2–5). Refluxing a solution of 10 g. of this in 200 ml. acetic acid and 4 g. acetic anhydride three hours, then pouring on ice, gave a quantitative yield of the N-acetyl derivatives, M. 250–60° C. This, in aqueous pyridine, oxidized by potassium permanganate, gave a 23% yield of the alkali-insoluble p-acetylamino-6-carboxylic acids. The oxidation cake contained an even larger amount of the desired product.

*Example XIII*

0.5 g. (.001 m.) of the acetylamino acid of Example XII was carefully mixed with 0.26 g. (.001 m.) of nylon 66 salt, i.e. the salt of hexamethylenediamine and adipic acid. A drop of methanesulfonic acid was added, and the mixture heated with occasional shaking (in a nitrogen atmosphere) to 200° C. over three hours, kept there three hours, then at 250° C. for six hours. A melt on a hot plate could be drawn into strings. A partial solution in dimethylsulfoxide, heated at 70° C. with aqueous formaldehyde and a drop of toluenesulfonic acid, lost most of its spectral amide absorptions and became completely insoluble.

We claim:

1. A solid polymer consisting essentially of the following recurring structural unit

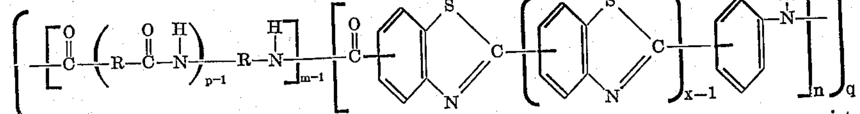

wherein R is a member selected from the group consisting of oxy-bis-phenylene, arylene radicals having from 6–16 carbon atoms and alkylene radicals having from 2–12 carbon atoms, $p$ is an integer having a value of 1 to 2, $x$ is an integer having a value of 1 to 5, $m$ has a minimum value of 1 and a maximum value such that the ratio of $m-1/n$ is no greater than 20, $n$ has a value of 1, and $q$ is an integer having a value of at least 2.

2. A copolymer of claim 1 wherein $x$ is 1, $p$ is 1, $m$ is at least 2, and R is hexamethylene.

3. A copolymer of claim 1 wherein $x$ is 1, $p$ is 2, $m$ is at least 2, and R is oxy-bis-phenylene.

4. A solid polymer consisting essentially of the following recurring structural unit

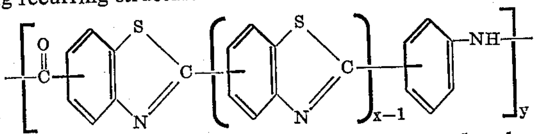

wherein $x$ is an integer having a value of 1 to 5 and $y$ is an integer having a value of at least 2.

5. Method of making a solid polymer consisting essentially of the following recurring structural unit

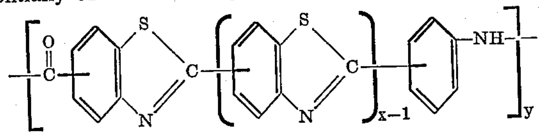

wherein $x$ is an integer having a value of 1 to 5 and $y$ is an integer having a value of at least 2, comprising reacting at a temperature of 180–450° C. a compound of the formula:

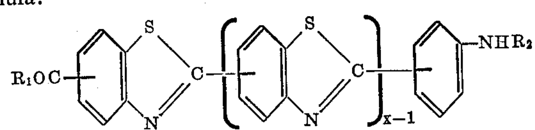

wherein $x$ has the value given aforesaid, $R_1$ is a member selected from the group consisting of hydroxy, hydrogen, lower alkoxy and phenoxy and $R_2$ is a member selected from the group consisting of hydrogen and alkanoyl.

6. Method according to claim 5 wherein the reaction is conducted in an inert atmosphere.

7. Method of making a solid copolymer consisting essentially of the following recurring structural unit

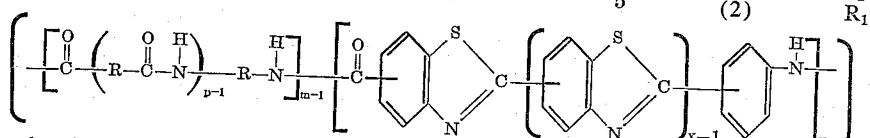

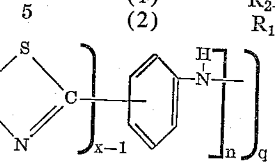

wherein R is a member selected from the group consisting of arylene radicals having from 6–16 carbon atoms and alkylene radicals having from 2–12 carbon atoms, $p$ is an integer having a value of 1 to 2, $x$ is an integer having a value of 1 to 5, $m$ has a minimum value of 2 and a maximum value such that the ratio of $m-1/n$ is no greater than 20, $n$ has a value of 1, and $q$ is an integer having a value of at least 2, comprising reacting at a temperature of 180–450° C. a compound of the formula:

wherein $x$ has the value given aforesaid, $R_1$ is a member selected from the group consisting of hydrogen, hydroxy, lower alkoxy and phenoxy and $R_2$ is a member selected from the group consisting of hydrogen and lower alkanoyl, with a member selected from the group consisting of (a) $R_2HN—R—COR_1$ wherein R, $R_1$ and $R_2$ have the values given aforesaid and (b) an equimolar mixture of the compounds (1) $R_2HN—R—NHR_2$ (2) $R_1OC—R—COR_1$ wherein R, $R_1$ and $R_2$ have the values given aforesaid, but may represent a different member of the same group in each of the compounds (1) and (2), the value of $p$ being 1 when member (a) is selected and 2 where member (b) is selected, and the mole ratio of the reactants being governed by the ratio of $m-1/n$ defined aforesaid.

8. Method according to claim 7 wherein the reaction is conducted in an inert atmosphere.

References Cited by the Examiner

UNITED STATES PATENTS

| | | | |
|---|---|---|---|
| 2,972,603 | 2/1961 | Cislak | 260—79 |
| 3,047,543 | 7/1962 | Morton et al. | 260—79 |
| 3,110,701 | 12/1963 | Wear | 260—78 |

WILLIAM H. SHORT, *Primary Examiner.*

H. D. ANDERSON, *Assistant Examiner.*